United States Patent [19]
Kuroki et al.

[11] Patent Number: 5,650,890
[45] Date of Patent: Jul. 22, 1997

[54] APPARATUS FOR CONTROLLING HUMIDITY IN A DISK DRIVE ENCLOSURE

[75] Inventors: Kenji Kuroki, Fujisawa; Yoshinao Harada, Chigasaki; Shunichroh Ota, Yokohama, all of Japan

[73] Assignee: International Business Machines Corporation, Armonk, N.Y.

[21] Appl. No.: 759,455

[22] Filed: Dec. 5, 1996

Related U.S. Application Data

[63] Continuation of Ser. No. 568,436, Dec. 6, 1995, abandoned, which is a continuation of Ser. No. 51,507, Apr. 22, 1993, abandoned.

[30] Foreign Application Priority Data

Apr. 30, 1992 [JP] Japan .................... 4-111579

[51] Int. Cl.$^6$ .................................................. G11B 23/03
[52] U.S. Cl. ......................................................... 360/97.02
[58] Field of Search ................................ 360/97.02, 137

[56] References Cited

U.S. PATENT DOCUMENTS

| | | | |
|---|---|---|---|
| 4,967,295 | 10/1990 | Yamauchi et al. | 360/97.02 |
| 5,012,360 | 4/1991 | Yamauchi et al. | 360/97.02 |
| 5,075,807 | 12/1991 | Inoue et al. | 360/97.02 |

FOREIGN PATENT DOCUMENTS

| | | | |
|---|---|---|---|
| 61-68792 | 4/1986 | Japan | 360/97.02 |
| 64-4996 | 1/1989 | Japan . | |
| 1-4996 | 1/1989 | Japan . | |
| 1-199389 | 8/1989 | Japan . | |

*Primary Examiner*—Robert S. Tupper
*Assistant Examiner*—David D. Davis
*Attorney, Agent, or Firm*—Roy W. Truelson; Richard E. Billion; Owen J. Gamon

[57] ABSTRACT

The inside wall of a head/disk enclosure is given a surface broad enough to adsorb and release easily a large amount of water vapor. In a first embodiment, the inside surface is treated by anodic oxidation using oxalic acid. In a second embodiment, the inside surface is treated with sodium carbonate and sodium chromate. In a third embodiment, the surface was etched with acid. The water adsorption capability acts as a buffer to prevent extremes of relative humidity within the enclosure.

12 Claims, 3 Drawing Sheets

FIG. I

APPARATUS FOR CONTROLLING HUMIDITY IN A DISK DRIVE ENCLOSURE

This application is a continuation of application Ser. No. 08/568,436, filed Dec. 6, 1995, now abandoned, which is a continuation of application Ser. No. 08/051,507, filed Apr. 22, 1993, now abandoned.

FIELD OF THE INVENTION

The present invention relates to the design of a hard disk drive data storage device and, in particular, to the control of humidity within a hard disk drive enclosure.

BACKGROUND OF THE INVENTION

In a hard disk drive, a head/disk enclosure of a sealed type or a semi-sealed type which can breathe the air only through a particle filter has been conventionally used to prevent malfunction due to dust in the air. However, in practice, the entirely sealed types of head/disk enclosure are few in number because of high cost or difficulties in technical respects, and the semi-sealed types of head/disk enclosure are commonly used.

Incidentally, whether the sealed type or the semi-sealed type, in a hard disk drive, internal humidity is not controlled; therefore, the hard disk drive may malfunction due to excessive or insufficient internal humidity. Such malfunction occurs, in many cases, due to the erosion or abrasion of the disk and the adhesion of the head to the disk.

The erosion of the disk is caused because a magnetic layer or a base plate, which is a component of the disk, is made of electrochemically unstable metals. A rate of erosion is strongly correlated with relative humidity; that is, the higher the relative humidity, the higher the rate of erosion, and when the relative humidity approaches 100% and water begins to condense, the rate will become much higher.

On the other hand, the abrasion of the disk is mainly caused by contact between the disk and the head at the time of contact start/stop of the disk drive, and the disk is protected by lubricant coated on the surface of disk against abrasion caused by contact of the disk with the head. However, if relative humidity falls below 5%, the property of the lubricant will be worsened, the disk will be less protected against abrasion and, therefore, will wear more due to contact with the head.

To the contrary, if relative humidity increases to some degree, vapor is extremely adsorbed by materials on the surface of the disk and the head will be captured at the time of contact start/stop of the disk drive, which may prevent the disk from rotating. Such adhesion of the head to the disk will be more prominent when condensation of water vapor occurs.

Therefore, to prevent the hard disk drive from malfunctioning and to increase its reliability, it is necessary to keep relative humidity inside the hard disk drive within an appropriate range.

Generally, most hard disk drives have no measures to control humidity therein and an appropriate range of humidity is defined only in specifications issued by disk drive manufacturers.

In prior art, several sources propose to control humidity in hard disk drives.

For example, Japanese Published Unexamined Patent Application (PUPA) No.1-199389 teaches a construction having a polymer film for absorbing vapor around a disk inside of a head/disk enclosure. Said polymer film uses a film formed by polyvinyl alcohol, etc., and the polymer film easily adsorbs vapor when humidity becomes high, since the more relative humidity becomes too high, the more adsorbing power for vapor becomes great. Also, when the humidity becomes too low, the film easily releases vapor, since only a small amount of heat is released for absorption; that is, the polymer film has a characteristic that the humidity in the head/disk enclosure can be controlled.

However, said film has a disadvantage that its property and shape is liable to easily change due to the adsorption of vapor and the characteristics of adsorption and evaporation deteriorate due to frequent adsorption and evaporation. Moreover, an apparatus having such construction has the disadvantage of an increase in the number of parts and an increase in the number of steps in assembly since enough film to control humidity in the head/disk enclosure must be provided around the disk drive.

Japanese PUPA No.64-4996 discloses a disk drive apparatus having a construction in which a capillary vessel aggregate with many micro holes for adsorbing water vapor is installed in a head/disk enclosure. The capillary vessel aggregate is actually a porous substance chemically treated by a hydrophilic substance and formed by sintering.

In such apparatus, it is an object to reduce humidity, and the humidity is not controlled. The capillary vessel aggregate is separately formed and fittings must be provided to the head/disk enclosure to install the capillary aggregate in the enclosure and, therefore, the prior art has the disadvantage of increasing the number of parts and steps in assembly.

SUMMARY OF THE INVENTION

An object of the present invention is to provide a reliable hard disk drive whose relative humidity can be easily controlled with a smaller number of parts and steps in assembly.

The hard disk drive according to the present invention is characterized in that the inside wall of a head/disk enclosure has a surface broad enough to adsorb and release water vapor to control the relative humidity in the head/disk enclosure.

In order to accomplish the object, according to preferred embodiments of the present invention, the inside wall of said head/disk enclosure is treated by anodic oxidation or chemicals to form micro holes thereon, or by etching by acid to form a coarse surface.

Generally, water contained in a head/disk enclosure exists not only as water vapor in the air, but also as water adsorbed in all exposed surfaces of the head/disk enclosure. The amount of adsorbed water significantly depends upon the state of the surface or the material of the enclosure and its temperature. Therefore, if the area of the surface is increased by selecting a manufacturing technique or material, more water than water vapor existing in the air can be retained as adsorbed water. When temperature rapidly changes, relative humidity in the air remarkably changes accordingly. In such a case, water vapor is adsorbed in the inside wall of the head/disk enclosure of high surface area or water adsorbed in the inside wall is released into the atmosphere in the enclosure to soften a rapid change of humidity.

As is well known, adsorption is the selective capture or condensation of molecules contained in a liquid or gas and having special structure on the surface of a solid. Those which can be solid adsorbent are porous and have micro holes of diameter less than 0.01 micron therein. An isotherm for a substance to be adsorbed and adsorbent system at constant temperature shows the equilibrium relationship between the concentration or partial pressure of the substance to be adsorbed in an external fluid (liquid or gas) and the concentration of the substance captured by the adsorbent. If the temperature changes, the system reaches another equilibrium state and adsorption or release of the substance will occur accordingly.

In the present invention, the substance to be adsorbed is water and the inside wall of the head/disk enclosure corresponds to the solid adsorbent. For example, if the inside wall of a head/disk enclosure made of aluminum is treated by anodic oxidation to form glass alumina, for a porous inside wall of large surface area, it shows remarkable activity, adsorbs water vapor in the air, and serves so as to soften the change of relative humidity with temperature. Further, according to the present invention, portions which act as adsorbent are made of metal or metallic oxide, which has the advantage of much more excellent durability and repeatability than a conventional organic compound. Still further, according to the present invention, since portions in which vapor is adsorbed or from which vapor is released are formed into a single piece of the head/disk enclosure, not only the number of parts but also the number of steps in assembly can be decreased. Still yet further, according to the construction of the present invention, since all inside surfaces of the head/disk enclosure can be those which serve absorption, they can easily contain as much vapor as they adsorb the total amount of water vapor in the enclosure.

According to the present invention, to obtain an inside wall of large surface area of the head/disk enclosure, other than by anodic oxidation described above, a method for forming a porous coat by chemical treatment on the inside wall or a method for making the surface of the inside wall coarse by etching by acid are used.

BRIEF DESCRIPTION THE DRAWINGS

DETAILED DESCRIPTION OF THE PREFERRED EMBODIMENT

Hereinafter, the present invention is described in detail in accordance with embodiments with reference to the accompanying drawing, but is not limited to them.

Figure 1:
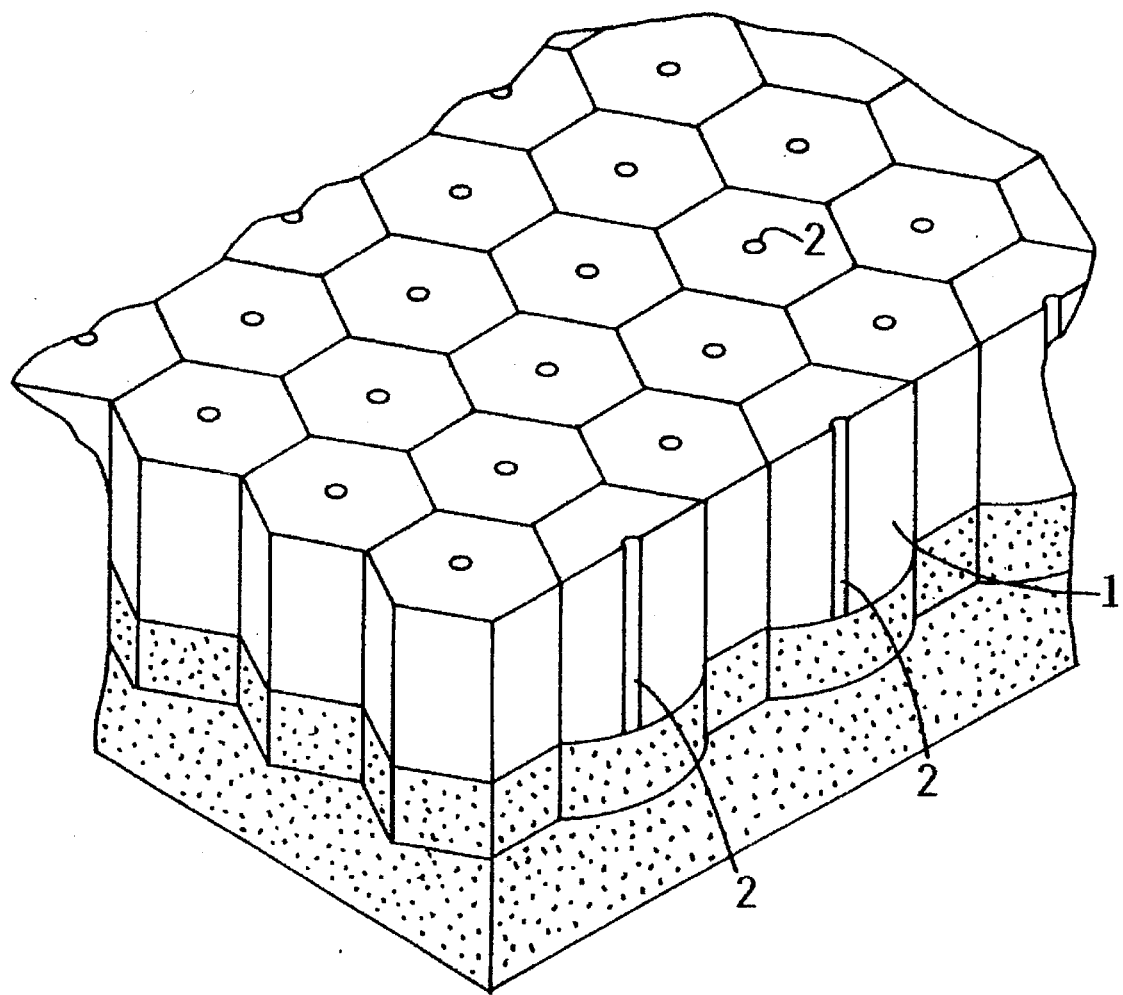
FIG. 1 is a perspective view showing a porous layer coated by anodic oxidation which can be preferably used for the inside wall of an enclosure for a disk drive according to the present invention.

In a first embodiment, by anodic oxidation using oxalic acid, the surface of an aluminum plate to be used for a head/disk enclosure was coated with a porous layer, as shown in FIG. 1. The diameter and depth of a micro hole 2 formed in oxide layer 1 are about 30 micron and 120 micron, respectively.

Figure 2:
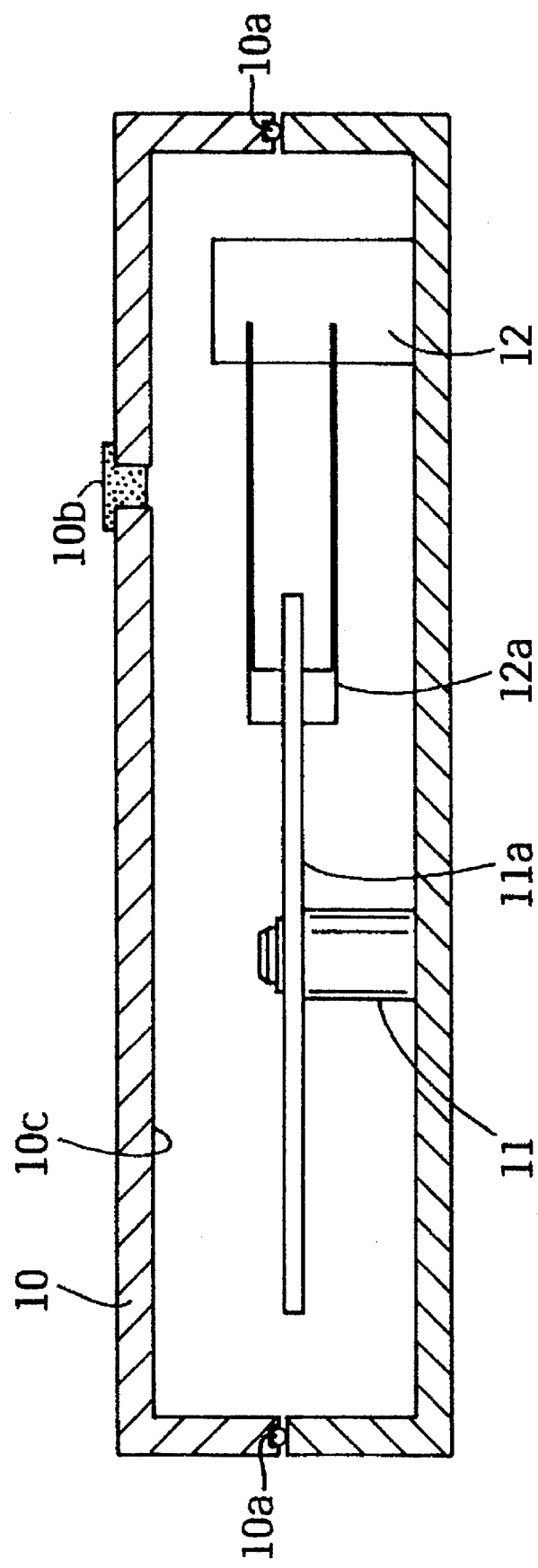
FIG. 2 is a cross sectional side view of an embodiment of the disk drive according to the present invention.

By using the aluminum plate thus obtained, as shown in FIG. 2, head/disk enclosure 10 for a 3.5-inch disk was formed. Head/disk enclosure 10 encloses spin motor 11 for rotating disk 11a, and head actuator 12 having transducer head 12a to integrate therein a hard disk drive. In FIG. 2, reference numerals indicated by 10a, 10b, and 10c show sealing sections for assembling head/disk enclosure 10, a ventilation filter, and an inside wall of head/disk enclosure 10, respectively.

The volume of air in the hard disk drive enclosure was about 80 ml. and the surface area of all inside walls of head/disk enclosure 10 was about 3.2 $m^2$.

Figure 3:
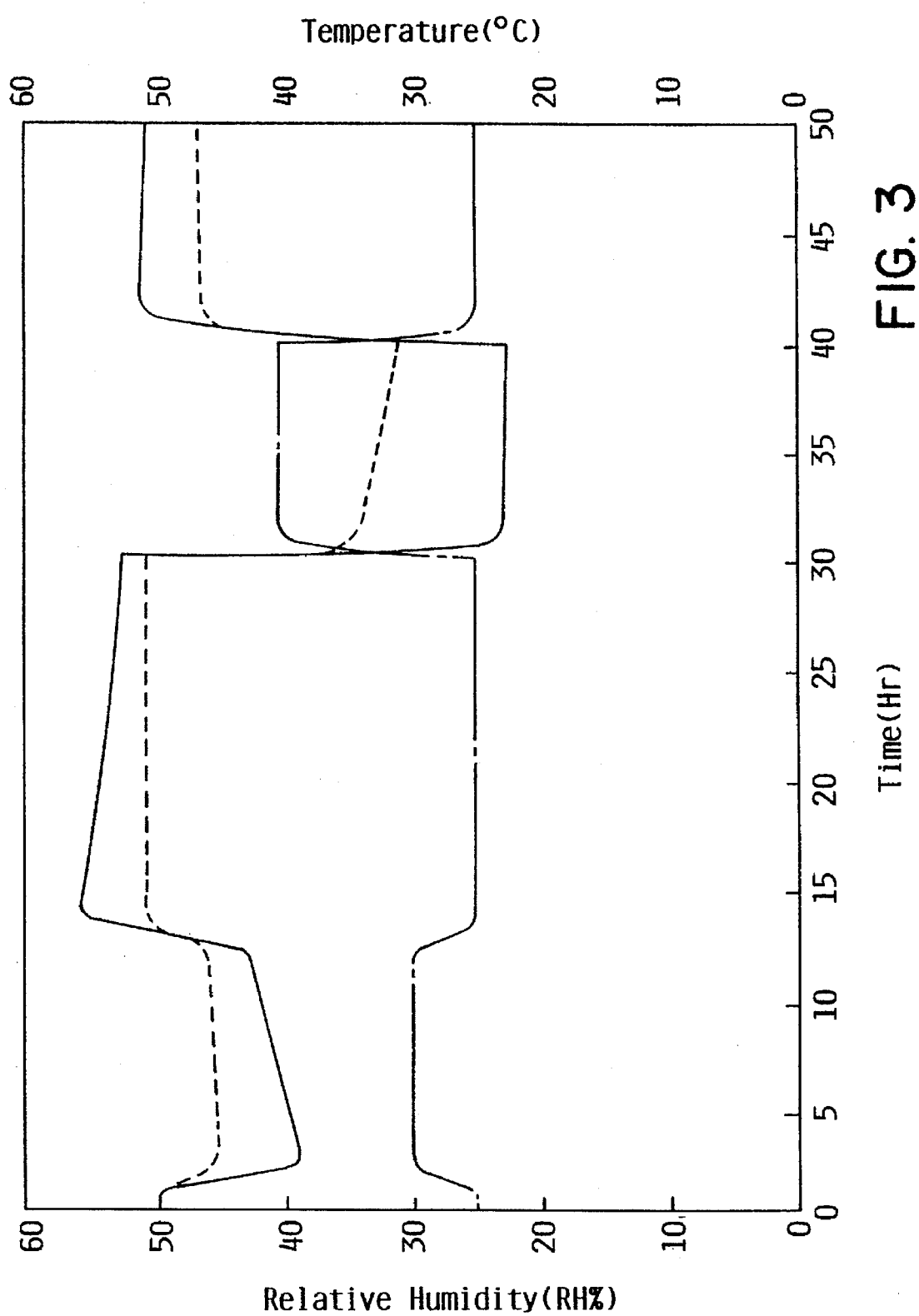
FIG. 3 is a graph showing the change of relative humidity with temperature for the disk drive according to the present invention and for a conventional disk drive.

By using the above disk drive and a conventional disk drive having the same size, the change of internal humidity with respect to temperature was measured. The area of all inside surfaces of the conventional disk drive was about 0.13 $m^2$. The results are shown in FIG. 3. The axes of abscissae and ordinates indicate elapsed time, and temperature and humidity, respectively, and a chain line, a solid line, and a dotted line indicate curves showing temperature, relative humidity in the conventional disk drive, and relative humidity in the disk drive according to the present invention, respectively.

As shown in FIG. 3, the change of temperature in 0 to 15 hours occurred according to the change of temperature in the air of the room and, on the other hand, the change of temperature in 30 to 42 hours occurred due to heat produced by the operation of the hard disk. The air of the room was at a constant humidity of 50%.

As is obvious from FIG. 3, the relative humidity (shown by the solid line) of the conventional hard disk drive changes remarkably when the temperature rises; however, that (shown by the dotted line) of the hard disk drive according to the present invention changes slowly. This means that when the temperature rises, the relative humidity of a hard disk drive drops and, therefore, in the hard disk drive according to the present invention, water adsorbed in the inside walls of the enclosure is released, and to the contrary, when the relative humidity rises with the drop of temperature, water vapor is adsorbed in the inside walls of the enclosure.

In a second embodiment, by chemical treatment using sodium carbonate and sodium chromate, the surface of an aluminum plate to be used for a head/disk enclosure was coated with a porous layer.

By using the aluminum plate thus obtained, the same as in the first embodiment, a head/disk enclosure for a 3.5-inch disk was formed. The head/disk enclosure encloses a spin motor having the disk, and a head actuator having a transducer head therein to integrate a hard disk drive.

The volume of air in the hard disk drive enclosure was about 80 ml. and the surface area of all inside walls of head/disk enclosure 10 was about 2.8 $m^2$.

By using the disk drive, the change of internal humidity with respect to temperature was measured and results thus obtained were much the same as in the first embodiment.

In a third embodiment, by etching with a well-known acid, the surface of an aluminum plate to be used for a head/disk enclosure was formed into a coarse surface having a large surface area.

By using the aluminum plate thus obtained, the same as in the first embodiment, a head/disk enclosure for a 3.5-inch disk was formed. The head/disk enclosure contains a spin motor having a disk, and a head actuator having a transducer head therein to integrate into a hard disk drive.

The volume of air in the hard disk drive enclosure was about 80 ml. The surface area of all inside walls of head/disk enclosure 10 was about 1.5 $m^2$, which was about 10 times that of the conventional disk drive.

By using the disk drive, the change of internal humidity with temperature was measured. The results thus obtained were not so effective as the first or second embodiments but were enough for practical mitigation of the change of relative humidity.

As described above, according to the present invention, the change of relative humidity in a hard disk drive with respect to temperature is controlled, and the extreme change of relative humidity is mitigated to prevent the relative humidity in the disk drive from becoming too high or too low. Especially, when a hard disk drive is in the air at a high temperature and humidity and rapidly cooled by an air-conditioner. For the conventional hard disk drive, water vapor condenses into dew on the disk and, thereby, erosion or the adhesion of the head to the disk will be caused. However, for the hard disk drive according to the present invention, the inside walls of which adsorb water vapor, almost no condensation occurs. Further, since the release of and the adsorption of water vapor occur reversibly and no deterioration in the quality of material on the inside walls occurs, the effect of slowing down the change of humidity can be shown for a long period of time.

What is claimed is:

1. A hard disk drive, comprising:

a hard disk for storing information;

a spin motor for rotating said disk;

a transducer head for accessing data on said disk;

a head actuator for moving said head;

a head disk enclosure enclosing said disk and said transducer head, said head disk enclosure having an external surface and an internal surface, said internal surface having micro holes therein to produce a surface which is broad enough to adsorb water vapor on said internal surface and release water vapor within an enclosed space formed by said enclosure to control the relative humidity within said enclosed space, a portion of this internal surface adjacent to the information storage surface of said hard disk wherein said micro holes penetrate less than the thickness of said enclosure.

2. The hard disk drive according to claim 1, wherein said internal surface of said head/disk enclosure is treated by anodic oxidation to form micro holes thereon.

3. The hard disk drive according to claim 1, wherein the internal surface of said head/disk enclosure is treated by chemicals to form micro holes thereon.

4. The hard disk drive according to claim 3, wherein said chemicals comprise sodium carbonate and sodium chromate.

5. The hard disk drive according to claim 1, wherein the internal surface of said head/disk enclosure is etched by acid to form into a coarse surface.

6. An enclosure component for a disk drive, said enclosure component forming at least a portion of an enclosure for said disk drive, said enclosure component comprising an inner surface and an outer surface, said inner surface of said enclosure having micro holes therein resulting in a surface being broad enough to adsorb water vapor on said internal surface and release water vapor to said enclosure to control the relative humidity within said enclosure, a portion of said internal surface adjacent to the information storage surface of a hard disk wherein said micro holes penetrate less than the thickness of said enclosure.

7. The enclosure component of claim 6, wherein said inner surface is treated by anodic oxidation to form micro holes thereon.

8. The enclosure component of claim 6, wherein said inner surface is treated by chemicals to form micro holes thereon.

9. The enclosure component of claim 8, wherein said chemicals comprise sodium carbonate and sodium chromate.

10. The enclosure component of claim 6, wherein said inner surface is etched by acid to form into a coarse surface.

11. The hard disk drive of claim 1, wherein said portion of said inner surface is substantially parallel to the information storage surface of said hard disk.

12. The enclosure component of claim 6, wherein said portion of said inner surface is substantially parallel to the information storage surface of said hard disk.

* * * * *